United States Patent [19]

Severeid

[11] Patent Number: 5,333,693

[45] Date of Patent: Aug. 2, 1994

[54] TRACTOR MOUNTED IMPLEMENT FOR REMOVING TREE STUMPS AND THE LIKE BURIED IN THE GROUND

[76] Inventor: Donald R. Severeid, 12512 164th St. East, Puyallup, Wash. 98374

[21] Appl. No.: 911,911

[22] Filed: Jul. 10, 1992

[51] Int. Cl.⁵ .............................................. A01G 23/06
[52] U.S. Cl. ........................................ 171/82; 37/302; 37/303; 254/132
[58] Field of Search ................. 171/50, 63, 21, 53, 171/54, 82; 414/23; 172/439; 37/2 R, 2 P, 270, 231; 254/199, 131.5, 132

[56] References Cited

U.S. PATENT DOCUMENTS

| | | |
|---|---|---|
| 41,287 | 1/1864 | Flanagan . |
| 277,894 | 5/1883 | Flynn . |
| 2,618,871 | 11/1952 | Craver .................................. 37/2 |
| 2,877,572 | 3/1959 | Dyess .................................. 37/2 |
| 3,057,599 | 10/1962 | Clatterbuck ...................... 254/132 |
| 3,103,076 | 9/1963 | Schultz .............................. 37/2 |
| 3,282,567 | 11/1966 | Wenijer ............................ 254/132 |
| 3,288,437 | 11/1966 | Pederson .......................... 254/132 |
| 4,069,846 | 1/1978 | Forslund ........................... 37/2 R |
| 4,321,761 | 3/1982 | Hedblom ......................... 37/2 R |
| 4,355,475 | 10/1982 | Harkness ......................... 37/2 R |
| 4,356,644 | 11/1982 | Harkness ......................... 37/2 |
| 4,467,876 | 8/1984 | Gaule .............................. 37/2 R |
| 4,641,439 | 2/1987 | Shirek ............................. 37/2 R |
| 4,676,013 | 6/1987 | Endo ............................... 37/2 R |
| 4,808,062 | 2/1989 | Bare ................................ 37/2 R |
| 5,022,632 | 6/1991 | Beideck ........................... 254/132 |
| 5,180,142 | 1/1993 | Nowlin ............................ 254/132 |

Primary Examiner—Randolph A. Reese
Assistant Examiner—Spencer Warnick
Attorney, Agent, or Firm—William G. Forster

[57] ABSTRACT

A tractor-mounted tree stump puller having articulating components that create a mechanical advantage to remove buried objects or the like from the ground in response to forward movement of the tractor. The implement comprises at least two components pivotally joined to form an articulating structure that shifts from a retracted position to an extended position upon forward movement of the tractor. An articulating structure so formed has a first end pivotally coupled to the tractor, and a second end rigidly attached to a forked structure. Just prior to the removal process, the forked structure is disposed to engage a buried object. With the forked structure engaging a buried object, the tractor moves in a forward direction causing the articulating components to shift from a retracted position to an extended position. As the articulating structure shifts to the extended position, a mechanical advantage is created to rotate and lift the tines of the forked structure, and likewise rotate and lift the buried object. In this way, the articulating stump puller multiplies the power of a tractor to lift buried objects from the ground. Accordingly, small tractors having limited pulling power can be employed to remove relatively large tree stumps or buried objects.

19 Claims, 4 Drawing Sheets

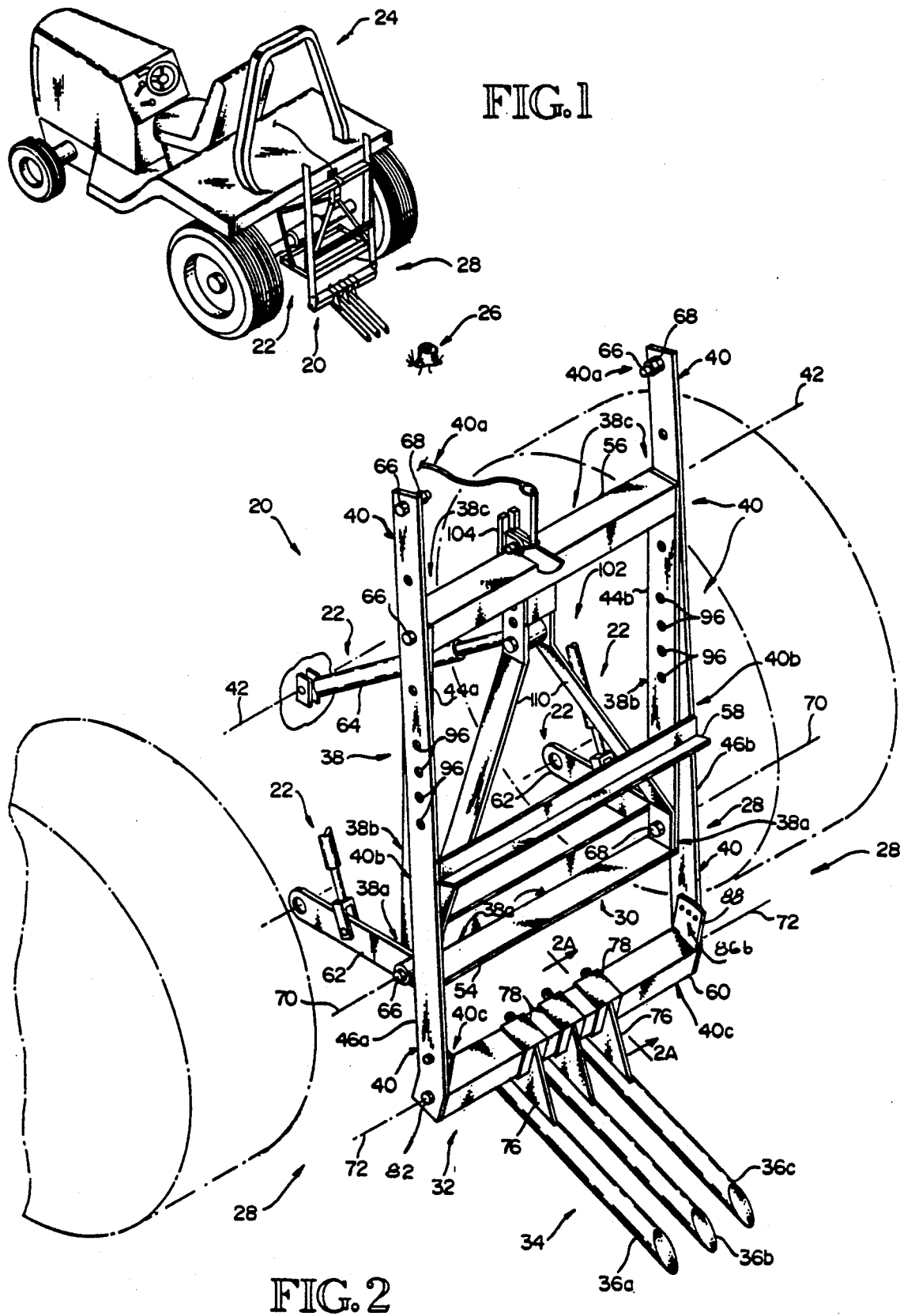

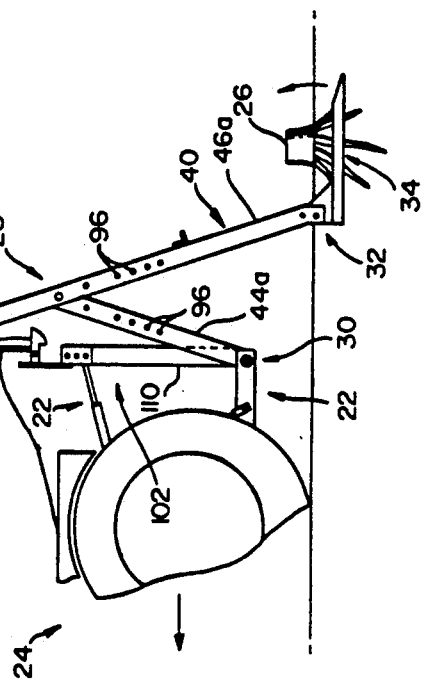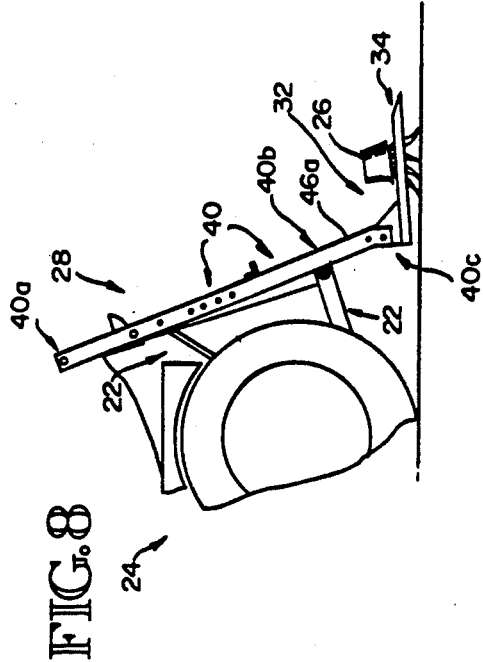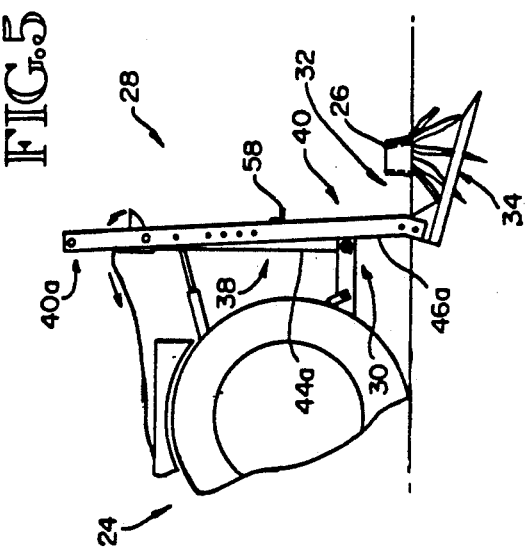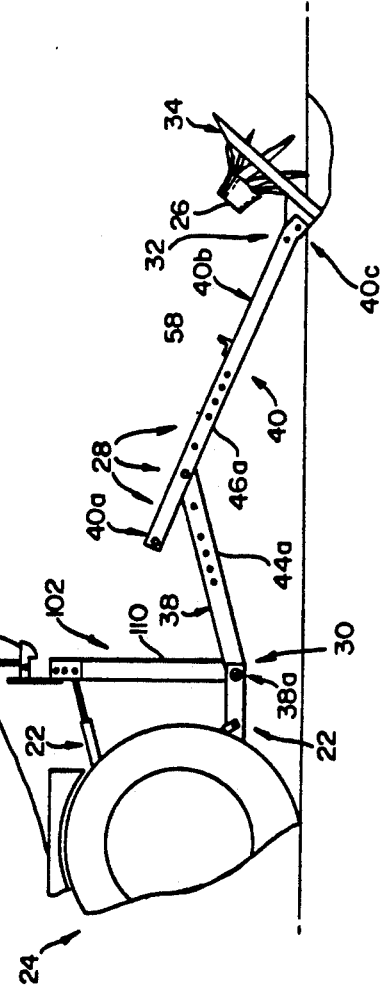

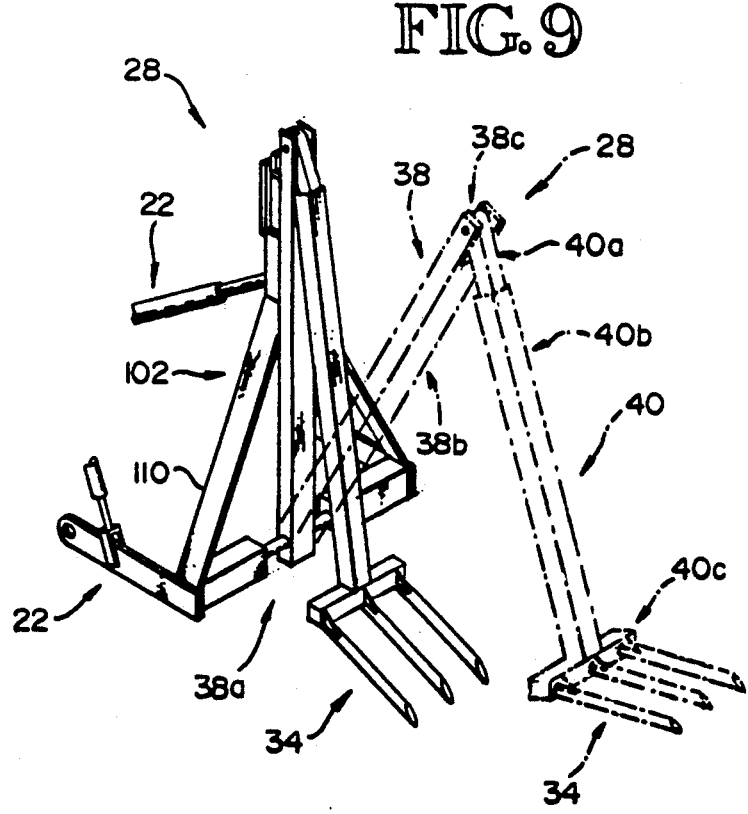

TRACTOR MOUNTED IMPLEMENT FOR REMOVING TREE STUMPS AND THE LIKE BURIED IN THE GROUND

BACKGROUND OF THE INVENTION

This invention relates generally to tractor-mounted tools or implements for removing unwanted buried tree stumps, and more particularly to tree stump removers having articulating members arranged to provide a mechanical advantage in removing buried tree stumps and the like from the ground.

A number of mechanisms have been invented to remove partially buried and completely buried objects from the ground. Some of the early designs included hand tools that operated completely by human power. For example, U.S. Pat. No. 41,287 to Flanagan discloses a grubbing machine that removes buried tree stumps by engaging that portion of the tree stump extending above the ground surface. This design, however, can properly function only if a tree stump is relatively small in diameter, and is extending above the ground a distance required for the machine to receive and grip the extended portion thereof. In addition, this design is limited by the pulling power of the person operating the tool.

Another early design, disclosed in U.S. Pat. No. 277,894 to Flynn, is a hand operated "Lifting-Jack and Spike and Stump Puller." Like the Flanagan invention, Flynn's device is limited to buried objects that have a portion thereof extending to or above the surface of the ground. Also, like Flanagan, its use is limited by the strength of the person operating the tool.

Similar to Flynn, the subsequent hand operated design disclosed in U.S. Pat. No. 4,356,644 to Pederson shares the same limitations of most hand operated tools, i.e., only small objects buried near to or extending above the ground surface can be removed or pulled from the earth, and the lifting capacity is limited by a person's strength.

Later designs started to take advantage of powered machinery such as tractors. To reduce human labor, tractors provided power to assist in the operation and transportation of tools or implements that remove buried objects. For example, U.S Pat. No. 2,618,871 to Craver illustrates a hydraulically operated stump lifter connected to the rear of a tractor. The Craver invention operates by hydraulically lifting a buried object vertically from the ground. This design, however, relies on a hydraulically operated mechanism that operates independent of the pulling power of the tractor to remove the buried object. Such devices are somewhat complicated to maintain and are expensive to purchase. In addition, only stumps of limited size can be lifted because of the stroke limitations of the hydraulic cylinder. Similar to Craver, U.S. Pat. No. 3,057,599 issued to Clatterbuck, shares some of the same limitations, e.g., its expensive, complicated to maintain, and a power source independent of the pulling power generated by tractor movement is required. Thus, like Craver, an independently powered mechanical device is required in addition to the tractor. Moreover, like Flynn and Flanagan, a portion of the buried object must extend above the ground surface to provide a gripping surface for the device to engage prior to the removing process. Also, because the tractor remains stationary during the removal process, the maximum size of buried object is limited by the maximum movement of its hydraulic, moving parts.

Later designs started to address the problem of removing buried objects that had no portion thereof disposed above the ground surface for a tool to grip. Included is U.S. Pat. No. 2,877,572 to Dyess, and U.S. Pat. No. 3,103,076 to Schultz. Both designs incorporate a member designed to operate below the ground surface to reach a buried object. The Dyess design removes buried objects by positioning a wedge shaped plate below the ground surface while employing a tractor to pull the object from the ground. This design, however, employs the unassisted power of the tractor to pull the buried object from the ground, i.e., the tractor's power is not enhanced by an implement designed to create a mechanical advantage. Thus, removal of a buried object is limited to the direct pulling power of the tractor.

Likewise, the Schultz design removes objects buried below the ground surface. However, to remove the buried object, it provides lifting power from a hydraulic mechanism connected to the tractor. Thus, like Clatterbuck and Craver, Schultz requires lifting power furnished independent from the tractor. Accordingly, there is the expense and complexity of an independent hydraulically operated device.

More recently, U.S. Pat. No. 4,356,644 to Harkness discloses a tractor mounted device that removes objects buried below the ground surface by a pivoting member that is partially braced against the ground, and is operated with the assistance of a double acting hydraulic cylinder. Thus, Harkness, like some prior devices cited above, relies on an independently powered hydraulic device to remove an object from the ground.

While such devices, cited above, all remove buried objects or partially buried objects from the ground, no presently available tool or implement provides a tractor mounted articulating structure that employs forward movement of a tractor to create a mechanical advantage to remove a buried object.

Accordingly, a need remains for a stump-puller that is simple, inexpensive, easy and safe to operate, and that is readily adapted to small tractors with limited pulling power to remove buried objects that may have little or no portion thereof extending above the ground.

SUMMARY OF THE INVENTION

It is one object of the invention to remove partially buried objects from the ground.

It is a second object of the invention to remove totally buried objects from the ground.

It is another object of the invention to remove tree stumps from the ground that remain from harvested trees.

It is a further object of the invention to remove trees from the ground in a way to allow the tree to be transplanted.

It is an additional object of the invention to be operated from a conventional three point tractor hitch.

It is yet another object of the invention to create a mechanical advantage to reduce the tractor pulling force required to remove a tree stump.

It is a further object of the invention to adapt to small and large tractors alike that have varying pulling capacities.

It is an additional object of the invention to permit removal of trees in confined spaces such as closely spaced Christmas tree rows, orchard vineyards, residential yards parks, etc.

The present invention is a multiple use tractor-mounted implement for pulling and removing tree stumps and other buried objects from the ground. Primarily, the tool is designed to operate from a conventional three point tractor connection. The implement comprises articulating components arranged to create a mechanical advantage to remove buried objects or the like from the ground. The implement operates in response to forward movement of the tractor. Included therein are at least two components pivotally joined to form an articulating structure that shifts from a retracted position to an extended position upon forward movement of the tractor. An articulating structure so formed has a first end pivotally coupled to the tractor, and a second end rigidly attached to a forked assembly. Just prior to the removal process, the forked assembly is disposed to engage a buried object. With the forked assembly so engaged, the tractor moves in a forward direction causing the articulating components to shift from a retracted position to an extended position. As the articulating structure shifts to the extended position, a mechanical advantage is created to rotate and lift the tines of the forked structure, and thereby rotate and lift the buried object. In this way, the articulating stump puller multiplies the pulling power of a tractor to lift buried objects from the ground. Accordingly, small tractors having limited pulling power can be employed to remove relatively large tree stumps or buried objects.

In addition, the pivot points between the components of the articulating structure are adjustable along the body of each component. Being able to adjust the pivot points allows the operator to reduce the forward distance required to shift the structure from the retracted position to the extended position. By reducing this distance, the stump puller can operate in confined spaces such as those found where rows of trees or tree stumps need removal.

Beyond this, in the preferred embodiment, the forked assembly is rotatable about a horizontal axis disposed at the second end of the articulating structure. More specifically, the forked assembly can be rotated about a horizontal axis, and locked into preselected positions. Being able to rotate, and lock the forked assembly to various preselected positions allows an operator to adjust the angle at which of the tines engage the buried object prior to its removal. This, in turn, allows the forked assembly to adjust to the optimal position for engagement with large and small buried objects and tree stumps.

An advantage of the invention is that a user can remain seated on a tractor while removing a series of buried objects, one after the other.

A further advantage is that the soil is minimally disturbed by the removal process, and is left in good condition for replanting.

Yet another advantage is that various additional tools such as a seedling root pruner, a tree transplantation scoop, lifting forks, and pallet forks can be employed as attachments to the invention.

The foregoing and other objects, features, and advantages of this invention will become more readily apparent from the following detailed description of a preferred embodiment which proceeds with reference to the accompanying drawings.

BRIEF DESCRIPTION OF THE DRAWINGS

FIG. 1 is a perspective view of an articulating tree stump remover mounted to a standard three point hitch on a tractor of the type having such a hitch attachment.

FIG. 2 is an enlarged perspective view of a tree stump remover mounted to a conventional three point tractor hitch.

FIGS. 5 through 8 are a series of partial side elevational views of a tree stump remover mounted to a conventional three point tractor hitch on a tractor of the type having such a hitch, wherein the series illustrates the steps of removing a tree stump.

FIG. 5 illustrates a tractor positioning the forked assembly of the tree stump remover under a buried tree stump for removal of a tree stump.

FIG. 6 illustrates a tree stump remover being released from the attachment frame, and shifting to an extended position responsive to forward movement of the tractor to remove a tree stump;

FIG. 7 illustrates a tree stump remover in the extended position with a tree stump removed from the ground;

FIG. 8 illustrates a tree stump remover in the retracted position for transporting a tree stump, the spring mounted latch engaging the articulating tree stump remover to maintain the same in the retracted position.

FIG. 9 is a perspective view illustrating a modification of the invention wherein the articulating frame consists of a single member components.

DETAILED DESCRIPTION OF PREFERRED EMBODIMENT

Figure 2A:
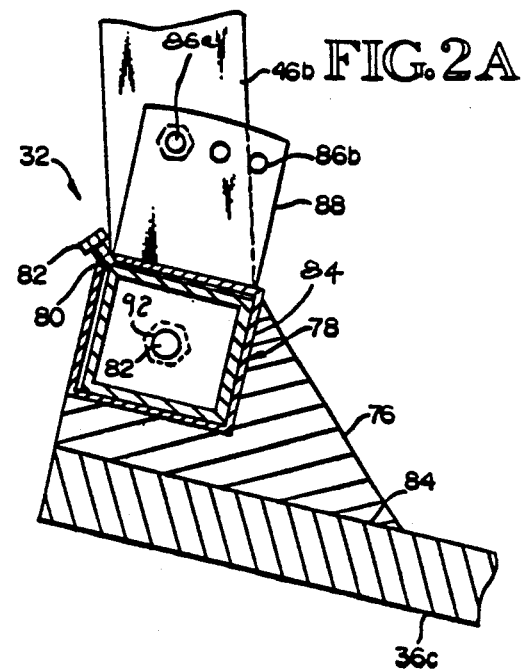
FIG. 2A is a cross-sectional view taken along line 2A—2A illustrating a rotatable adjustable fork assembly that rotates about a horizontal axis.
Figure 3:
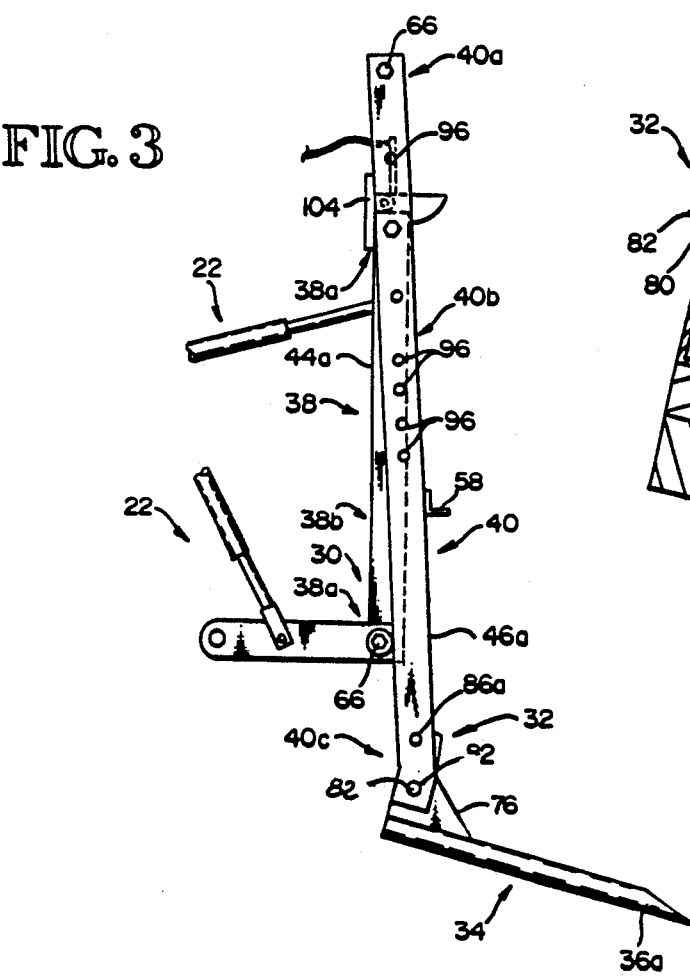
FIG. 3 is a side elevational view of a tree stump remover in the retracted position.
Figure 4:
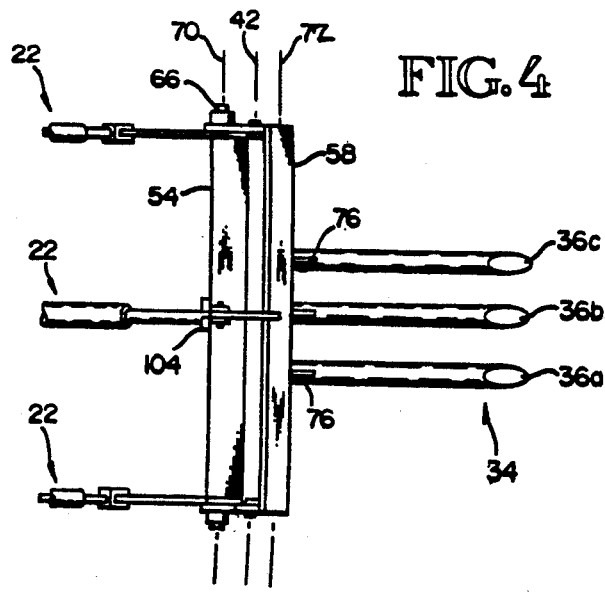
FIG. 4 is a top plan view of a tree stump remover in the retracted position.

FIGS. 1 through 9 show a preferred embodiment of the invention. The overall arrangement is first described with reference to FIGS. 1–4. Then the various parts of the stump remover 20 are described with reference to the corresponding drawing Figures. Then the operation of the stump remover 20 is illustrated in FIGS. 5 through 8. FIG. 9 illustrates an alternate embodiment of the invention.

Referring to FIGS. 1 through 4, a stump remover 20 is illustrated as being connected to a conventional three point hitch 22 of a tractor 24. The stump remover 20 is configured to remove buried objects such as tree stumps 26 or the like having little or no portion thereof extending above the surface of the ground.

The stump remover 20 includes an articulating structure 28 having a first end 30 pivotally connected to a conventional three point hitch 22 of a tractor 24, and a second end 32 fixedly attached to a forked assembly 34. As will be more fully explained later, the articulating structure operates to create a mechanical advantage responsive to forward movement of the tractor. This mechanical advantage is employed to efficiently remove the tree stump 26. Accordingly, a small tractor pulling force can remove relatively large tree stumps or buried objects.

The forked assembly 34 has three tines 36a, 36b, and 36c that releasably engage the buried object to remove the same from the ground. That is, just prior to the removal of the tree stump 26, the tines 36a–36c of the forked assembly 34 are positioned under or through the tree stump 26 so that when the first end 30 of the articulating structure 28 is shifted away from the second end 32 of the articulating structure 28, the tines 36a–36c of the forked assembly 34 rotate, lift, and move forward with the tractor wherein the tree stump 26 is urged to likewise rotate, lift, and move forward with the tractor.

Considering now in more detail the structure of the components from which the stump remover 20 is constructed, the articulating structure 28 comprises a first elongate component 38 pivotally connected to a second elongate component 40. Components 38 and 40 are so connected to pivot about a horizontal axis 42 thereby forming an articulating structure 28.

In further detail, the first component 38 has a first end 38a, which is also the first end 30 of the articulating structure 28. In addition, the first component 38 includes a second end 38c, and a body 38b disposed therebetween. Similarly, the second component 40 has a first end 40a, a second end 40c, which is also the second end 32 of the articulating structure 28, and a body 40b disposed therebetween. To provide lateral stability of the articulating structure 28 when removing buried objects, each component, 38 and 40, of the articulating structure 28 includes a pair of parallel, spaced apart members, i.e., the first component 38 comprises two parallel spaced apart members 44a and 44b, and the second component 40 similarly comprises two parallel, spaced apart members 46a and 46b.

The parallel, spaced apart position of members 44a and 44b of first component 38, relative to each other, is rigidly fixed by elongate transverse members 54 and 56 disposed at opposite ends of members 44a and 44b, i.e., at the opposite ends 38a and 38c of first component 38. That is, transverse member 54 is disposed at the end 38a of first component 38, and transverse member 56 is disposed at the end 38c of first component 38. To permit welding of the transverse members 54 and 56 into position, the preferred embodiment of the articulating structure 28 is fabricated of metal, preferably steel. As such, the transverse members 54 and 56 are parallel, and spaced apart, and welded to members 44a and 44b to form the first component 38. For ease of fabrication, the transverse members 54 and 56 are fabricated of angle iron, and the elongate members 44a and 44b are fabricated of steel bar material.

Similarly, the parallel, spaced apart position of members 46a and 46b of the second component 40, relative to each other, is rigidly fixed by elongate transverse members 58 and 60. In contrast to the first component 38, however, one transverse member 58 is rigidly disposed in the body 40b of second component 40 while the other transverse member 60 is rigidly disposed at the end 40c of second component 40, i.e., the second end 32 of the articulating structure 28. Thus, the transverse members 58 and 60 are parallel and spaced apart, and welded to members 46a and 46b to form the second component 40. Like transverse members 54 and 56, member 58 is fabricated from angle iron. Transverse member 60, however is fabricated from steel tube as will be more fully explained below. Like members 44a and 44b, members 46a and 46b are also fabricated of steel bar material.

Turning now to FIGS. 2 and 2A, the forked assembly 34 is illustrated and includes three tines 36a–36c. Each tine is fixedly connected, preferably welded with a filet weld 84, to a gusset plate 76 which is, in turn, fixedly connected to a sleeve 78 made from tubular material. Similarly, a filet weld 84 is employed to fix the gusset 76 to the sleeve 78. The sleeve 78 is sized to be slightly larger than the tubular transverse member 60 of the second component 40. That is, the inside dimension of the sleeve 78 is slightly larger then the outside dimension of the transverse member 60. In this way, the transverse member 60 can coaxially receive each tine in a way that permits each sleeve 78, and therefore, each tine to slide laterally to any desired position along transverse member 60, i.e., each tine is independently adjustable in the horizontal direction.

Moreover, once each tine is positioned along transverse member 60, it can be fixed to remain in that position. More specifically, each sleeve 78 of tines 36a–36c further include a threaded bore 80 extending through the sleeve, and sized to threadably engage a bolt 82. Thus, to prevent horizontal movement of sleeve 76, a bolt 82 is urged against the transverse member 60.

The tines 36a–36c, in addition to being adjustable in a lateral direction, are vertically adjustable. That is, the tines 36a–36c are rotatably adjustable about a horizontal axis 72 disposed at the second end 40c of the second component 40. In further detail, a plate 88 is fixedly attached, i.e., welded, to each end of the transverse member 60. The plate 88 is elongated to extend upward from the transverse member 60, i.e., in a direction extending along the second component 40. A coaxial bore 92, i.e., coaxial to axis 72, extends through each plate, and through each member 46a and 46b of the second end 40c of the second component 40, and is provided to receive a bolt 82 therethrough.

This configuration permits the transverse member 60 to freely rotate about horizontal axis 72 thus allowing the tines 36a–36c to similarly rotate. Further, the extending portion of the plate 88 provides a surface for a series of holes 86b disposed to provide a means to prevent or lock the rotation of the transverse member 60 at any of several preselected positions. Thus to prevent such rotation, a bolt 86a is disposed through a preselected hole 86b, and through a coaxial bore disposed through the second end 40c of the second component 40. As such, the tines 36a–36c can rotate about horizontal axis 72 and lock into a position preselected to provide the optimal angle to engage the buried object.

Turning now to FIGS. 5 through 8, the steps to remove a buried object or stump are illustrated. First, with reference to FIG. 5, a stump remover 20 is attached to the three point hitch assembly 22 of a tractor 24 with the articulating structure 28 being in the retracted position. That is, the first component 38, and the second component 40 are pivoted about horizontal axis 42 so that the first end 38a of the first component 38 is nearly touching the second end 40c of the second component 40. In this position, the tines 36a–36c of the forked assembly 34 are engaged with a tree stump 26 when the tractor 24 is operated to move forward toward the tree stump 26 while simultaneously lowering the forked assembly 34. As will be more fully described below, the forked assembly 34 is lowered by pivoting the articulating assembly 28 about horizontal axis 70.

Next, as illustrated in FIGS. 6 and 7, the tractor 24 moves forward away from the tree stump 26. This movement causes the articulating structure 28 to shift to the extended position, i.e., the first component 38 and the second component 40 pivot about axis 42 so that the first end 38a moves forward away from the second end 40c of the second component 40. As the articulating structure 28 so shifts, the forked assembly rotates and lifts the stump 26 from the ground. To prevent the articulating structure 28 from over extending, bolts 66 are disposed through the first end 40a of the second component thereby restricting the pivoting action of the articulating structure 28. Bolts so disposed are held in place by nuts 68 screwed thereon.

As the articulating structure 28 shifts from a retracted position to an extended position, upon forward movement of the tractor 24 away from the stump 26, a mechanical advantage is created to rotate the forked assembly 34. This occurs when a forward acting force is applied at a distance from the forked assembly 34 wherein the second component 40 acts as a lever.

Next, after the stump 26 is fully removed, the tractor movement is reversed thereby returning the articulating structure 28 to the retracted position. As will be more fully discussed below, the articulating structure 28 can then be locked in the retracted position so that the stump can be hauled to a suitable place for disposal.

If a stump remover 20, as described above, is employed to remove buried objects in confined areas, i.e., in areas where the articulating structure cannot fully extend, a means for adjustment is provided by holes 96 disposed in members 44a–44b, and 46a–46b of the first and second components 38 and 40. Holes so disposed permit the pivot axis 42 of the first and second components 38 and 40 to be selectably adjusted along the body 38b and 40b of the first and second components 38 and 40. Thus, for example, as the pivot axis 42 is adjusted closer to the forked assembly 34, the articulating structure 28 requires less space to fully extend. This occurs because the second component is effectively shortened. Similarly, the pivot axis 42 can be adjusted closer to the first end 38a of the first component 38 thereby effectively shortening the first component 38 to reduce the fully extended length of the articulating structure 28.

Returning again to FIG. 2, an attachment frame 102 is illustrated having a spring biased latch assembly 104 disposed thereon. The attachment frame 102 comprises two matching members 110 pivotally connected to the draw bar arms 62 of a conventional three point hitch assembly 22. Matching members 110 extend upward and come together to connect with the draw bar link 64 of the three point hitch assembly 22. In addition, the point of connection between the draw bar link and matching members 110 is selectably adjustable in the upward or vertical direction. A draw bar link 64 so connected secures members 110 in the upright position. With the members 110 of the attachment frame 102 locked in an upright position, the latch assembly 104 is disposed to releasably engage the second end 38c of the first component 38. Accordingly, the articulating structure can be locked in the retracted position. Additionally, the point of connection between the attachment frame members 110 and the draw bar link 64 can be adjusted vertically thereby adjusting the position of the articulating structure 28 when it is in the locked, retracted position.

Turning now to FIG. 9, a modification of the stump puller is illustrated. Therein, a stump puller includes an articulating structure 28 having a first component 38 and a second component 40 pivotally interconnected. In operation, the modification operates similarly to the preferred embodiment by creating a mechanical advantage when shifted from a retracted position to an extended position. In contrast to the preferred embodiment, however, the first and second components, 38 and 40, are single members and therefore do not require transverse members as does the preferred embodiment. Although this modification requires less components, it is somewhat less stable under large pulling forces.

Having illustrated and described the principles of my invention in a preferred embodiment thereof, it should be readily apparent to those skilled in the art that the invention can be modified in arrangement and detail without departing from such principles.

I claim all modifications coming within the spirit and scope of the accompanying claims:

1. A multiple use tractor mounted implement for removing objects buried below the surface of the ground for attachment to tractors of the type having a conventional three point connection, the implement comprising:
    a first elongate component having a first end, a second end, and a body disposed therebetween, the first end of the first component being adapted to pivotally connect to a conventional three point connection of a tractor for pivotal movement about a horizontal axis;
    a second elongate component having a first end, a second end, and a body disposed therebetween the second component being pivotally connected to the first component such that first and second components so connected pivot about a horizontal axis, the first and second components being so attached to form an articulating structure that can shift between a first, retracted position, and a second extended position; a forked assembly fixedly attached to the second end of the second component, the forked assembly having at least two tines;
    the forked assembly so attached being disposed to releasably engage the buried object while the articulating structure is in the retracted position, wherein forward movement of the tractor shifts the articulating structure to the second extended position, wherein the forked assembly rotates and lifts the buried object from the ground responsive to the articulating structure shifting to the second extended position; and
    wherein the forked assembly is rotatably adjustable to preselected positions about a horizontal axis that extends normal to the direction of the tines.

2. A multiple use implement as recited in claim 1 wherein each of the tines of the forked assembly is independently adjustable in a lateral direction.

3. A multiple use implement as recited in claim 1 wherein the implement further comprises:
    means for locking the articulating structure in the first retracted position.

4. A multiple use implement as recited in claim 3 wherein the locking means comprises an attachment frame adapted to be supported by the three point hitch; and
    means to releasably engage the articulating structure in the first retracted position, said engaging means being fixed to said attachment frame.

5. A multiple use implement as recited in claim 4 wherein said engaging means includes a spring biased latch disposed to engage the articulating structure while the articulating structure is in the first retracted position.

6. A multiple use implement as recited in claim 1 wherein the first component is constructed of a plurality of elongate members arranged in parallel spaced relation.

7. A multiple use implement as recited in claim 6 wherein the second component is constructed of a plurality of elongate members arranged in parallel spaced relation.

8. A multiple use implement as recited in claim 7 wherein the elongate members of the first component are fixedly secured in parallel spaced relation by at least one transverse member, said transverse member being fixedly attached to each member.

9. A multiple use implement as recited in claim 7 wherein the elongate members of the second component are fixedly secured in parallel spaced relation by at least one transverse member, said transverse member being fixedly attached to each member.

10. A multiple use tractor mounted implement for removing objects buried below the surface of the ground for attachment to tractors of the type having a conventional three point connection, the implement comprising:
- a first elongate component having a first end, a second end, and a body disposed therebetween, the first end of the first component being adapted to pivotally connect to a conventional three point connection of a tractor for pivotal movement about a horizontal axis;
- a second elongate component having a first end, a second end, and a body disposed therebetween, the second component being pivotally connected to the first component such that first and second components so connected pivot about a horizontal axis, the first and second components begin so connected to form an articulating structure that can shift between a first, retracted position, and a second extended position;
- a forked assembly fixedly attached to the second end of the second component, the forked assembly having at least two tines;
- the forked assembly so attached being disposed to releasably engage the buried object while the articulating structure is in the retracted position, wherein forward movement of the tractor shifts the articulating structure to the second extended position, wherein the forked assembly rotates and lifts the buried object from the ground responsive to the articulating structure shifting to the second extended position;
- wherein the horizontal pivot axis of the articulating structure is formed by having, the second end of the first component pivotally connected to the body of the second component ; and
- wherein the pivot axis between the first and second components is selectably adjustable along the body of the second component.

11. A multiple use implement as recited in claim 10 wherein the horizontal pivot axis between the first and second components is selectably adjustable along the body of the first component.

12. A multiple use implement as recited in claim 10 wherein a plurality of holes disposed through the body of the second component define the location of the horizontal pivot axis.

13. A tractor mounted implement for removing objects having a portion thereof buried below the surface of the ground, the implement comprising:
- means for releasably engaging a buried object;
- an articulating structure having two pivotally connected components rotatable about a pivot axis the articulating structure having a first end pivotally connected to a tractor, and a second end fixedly attached to the engaging means, the articulating structure being able to shift from a first retracted position to a second extended position responsive to forward movement of the tractor, wherein the engaging means if rotated responsive to the articulating structure being so shifted;
- the buried object so engaged being rotated and removed from the ground responsive to the articulating structure shifting from the retracted position to the extended position; and
- wherein the pivot axis between said two pivotally connected components of the articulating structure is selectably adjustable to a plurality of locations disposed on one of the pivotally connected components.

14. A tractor mounted implement as recited in claim 13 wherein a plurality of holes formed through at least one component define the location of the pivot axis.

15. A multiple use tractor mounted implement for removing objects having a portion thereof buried below the surface of the ground for attachment to tractors of the type having a conventional three point connection, the implement comprising:
- a first elongate component having a first end, a second end, and a body disposed therebetween, the first end of the first component being adapted to pivotally connect to a conventional three point connection of a tractor for pivotal movement about a horizontal axis;
- a second elongate component having a first end, a second end, and a body disposed therebetween, the second component being pivotally connected to the first component such that first and second components so connected pivot about a horizontal axis to form an articulating structure that can shift between a first, retracted position, and a second extended position;
- a forked assembly fixedly attached to the second end of the second component, the forked assembly having at least two tines;
- the forked assembly so attached being disposed to releasably engage a buried object while the articulating structure is in the first retracted position, wherein forward movement of the tractor shifts the articulating structure to the second extended position, wherein the forked assembly rotates and lifts the buried object from the ground responsive to the articulating structure shifting to the second extended position; and
- means releasably locking the articulating structure in the first retracted position responsive to the structure being shifted to the first retracted position.

16. A multiple use implement as recited in claim 15 wherein the locking means comprises an attachment frame adapted to be supported by the three point connection; and
- means to releasably engage the articulating structure in the first retracted position, said engaging means being fixed to said attachment frame.

17. A multiple use implement as recited in claim 16 wherein said engaging means includes a spring biased latch disposed to engage the articulating structure while the articulating structure is in the first retracted position.

18. A multiple use implement as recited in claim 15 wherein the first component is constructed of a plurality of elongate members arranged in parallel spaced relation.

19. A multiple use implement as recited in claim 18 wherein the second component is constructed of a plurality of elongate members arranged in parallel spaced relation.

* * * * *